United States Patent [19]
Gupta et al.

[11] Patent Number: 5,799,877
[45] Date of Patent: Sep. 1, 1998

[54] FLUID DISTRIBUTION ACROSS A PARTICULATE BED

[75] Inventors: Ramesh Gupta, Berkeley Heights; Jeffrey W. Frederick, Morris Plains, both of N.J.

[73] Assignee: Exxon Research and Engineering Company, Florham Park, N.J.

[21] Appl. No.: 582,602

[22] Filed: Jan. 3, 1996

[51] Int. Cl.⁶ ............................................. A62C 5/02
[52] U.S. Cl. .................... 239/8; 239/423; 239/424; 422/106; 261/114.1
[58] Field of Search .................... 239/8, 398, 418, 239/423, 424, 425.5, 427.3; 422/106, 110; 261/114.1

[56] References Cited

U.S. PATENT DOCUMENTS

| | | | |
|---|---|---|---|
| 993,125 | 5/1911 | Teisset | 261/114.1 |
| 1,738,386 | 12/1929 | Morrell | 261/114.1 |
| 2,242,267 | 5/1941 | Seidel | 261/114.1 |
| 2,581,881 | 1/1952 | Pyle et al. | 261/114.1 |
| 2,651,833 | 10/1953 | Dean et al. | 261/114.1 |
| 2,808,294 | 10/1957 | Tamminga | 239/140 |
| 3,202,201 | 8/1965 | Masella et al. | 239/549 |
| 3,488,044 | 1/1970 | Shepherd | 239/549 |
| 3,685,740 | 8/1972 | Shepherd | 239/424 |
| 3,741,484 | 6/1973 | Cresswell | 239/424 |
| 3,954,921 | 5/1976 | Yoshida et al. | 239/549 |
| 4,526,757 | 7/1985 | Gupta | 422/106 |
| 5,011,675 | 4/1991 | Haure et al. | 423/659 |
| 5,403,561 | 4/1995 | Koros et al. | 422/195 |
| 5,575,341 | 11/1996 | Baker et al. | 239/424 |

*Primary Examiner*—Andres Kashnikow
*Assistant Examiner*—Lisa Ann Douglas
*Attorney, Agent, or Firm*—Roy J. Ott

[57] ABSTRACT

A means and method for spraying liquid and gas onto and across a particulate bed includes a horizontal liquid distribution tray disposed over the bed containing a plurality of gas and liquid spray distributors extending through the tray. The distributors include separate gas and liquid conduits or pipes having an entrance on top and an exit below, with the exits proximate each other underneath the tray. The conduits are coaxial with a portion of the gas conduit surrounded by the liquid conduit to define an annular space between them for the liquid to flow downwardly through. The gas flows down through the gas conduit, exiting as a gas core surrounded by the downflowing liquid. The gas expands and contacts the surrounding liquid to spray it on the matter below. A liquid spray generating device is located below the gas and liquid exit. Siphon caps automatically provide pulse flow of the liquid. Combining the siphon caps with orifices or slots in the liquid conduit below the siphon line automatically provides both continuous and pulse spray of the liquid onto the bed below.

18 Claims, 2 Drawing Sheets

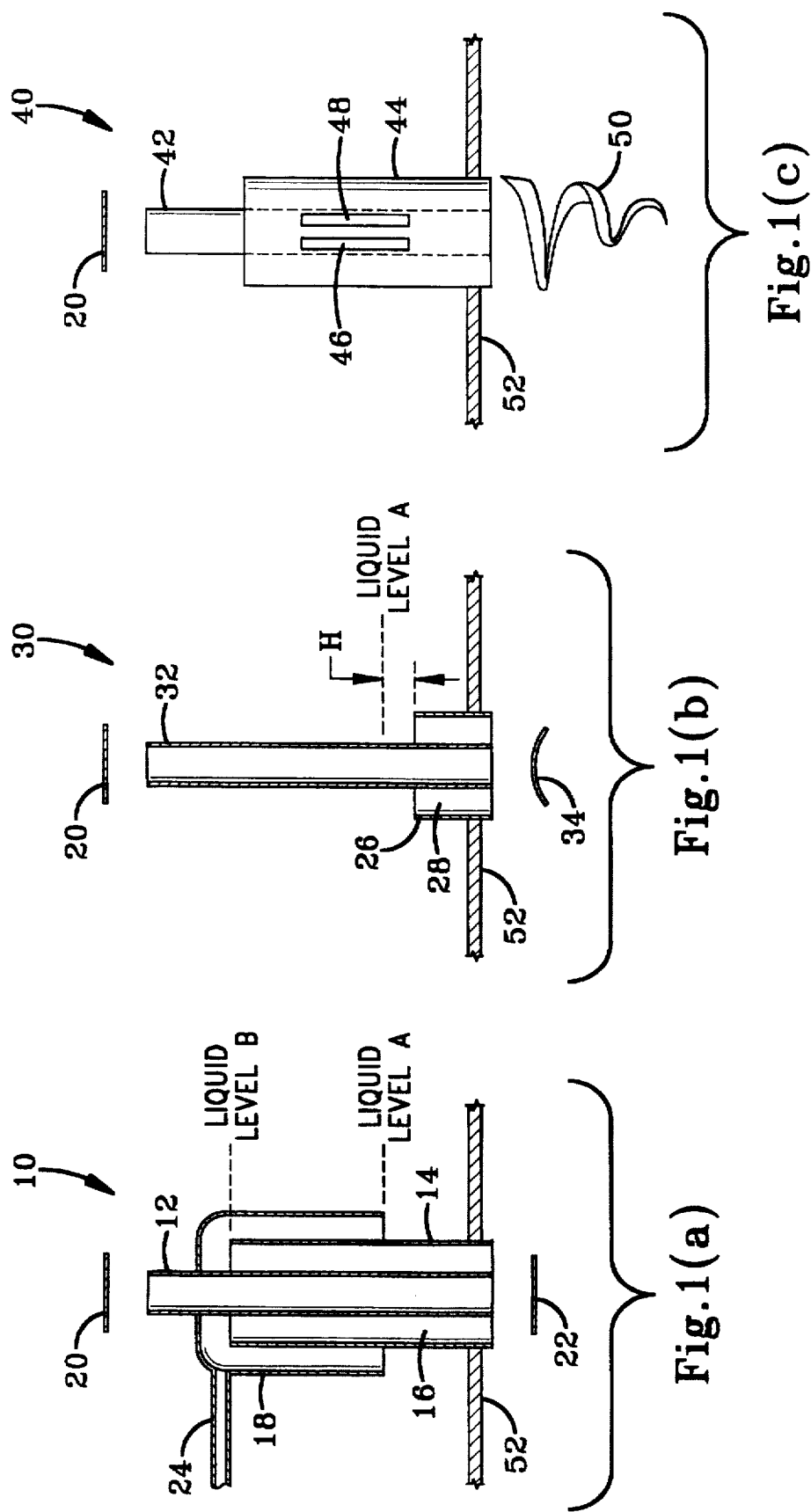

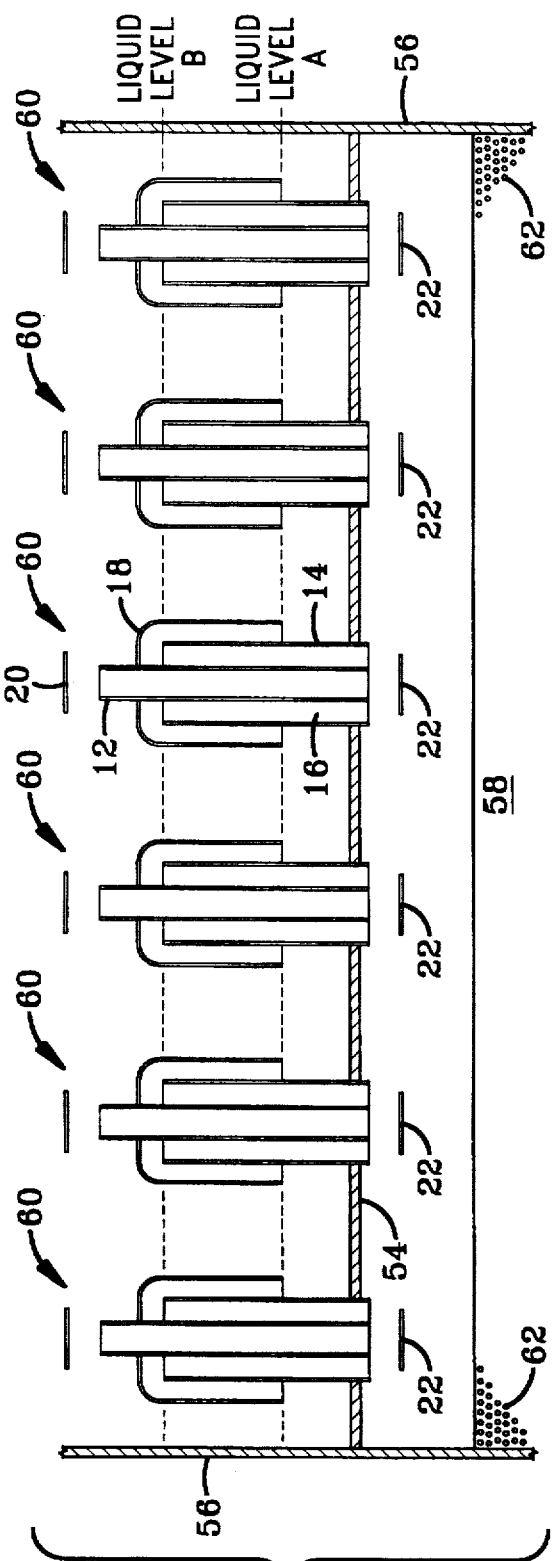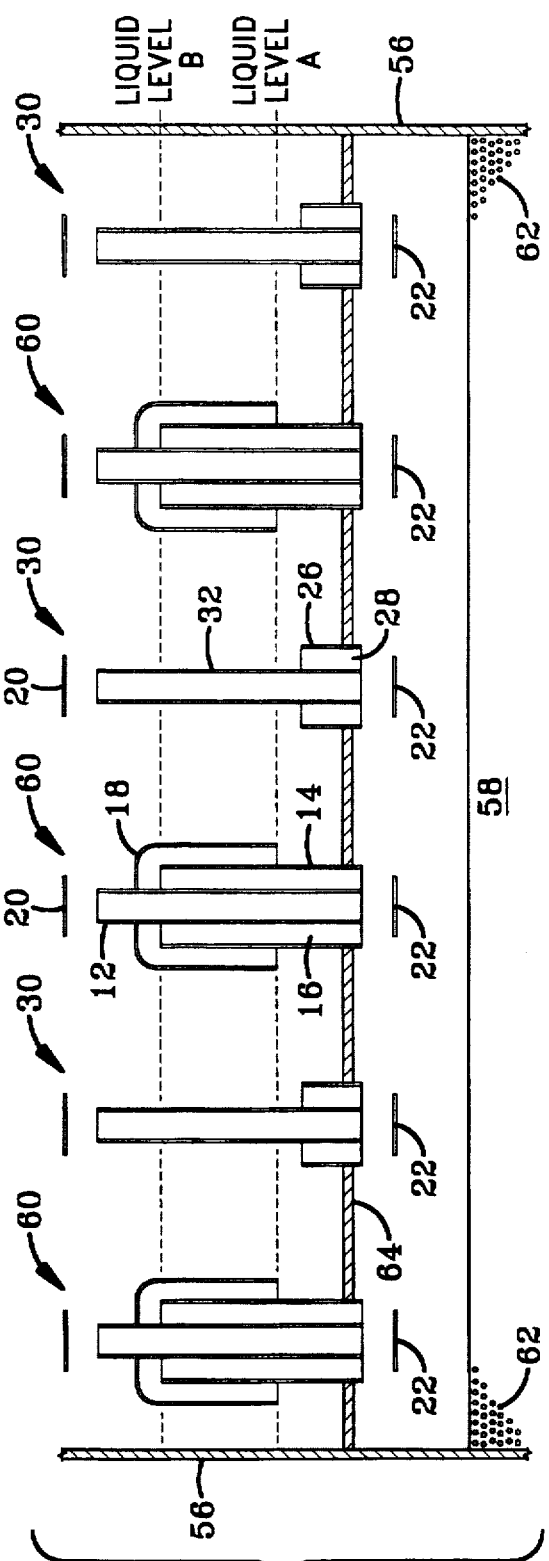

FLUID DISTRIBUTION ACROSS A PARTICULATE BED

BACKGROUND OF THE INVENTION

1. Field of the Invention

The invention relates to a method and an apparatus for improving the distribution of gas and liquid across a particulate bed. More particularly, the invention relates to fluid distribution means and a process useful in a fixed bed reactor for providing a uniform distribution of gas and liquid mixed phases across the bed with low pressure drop, wherein said means comprises a gas conduit annularly surrounded by a liquid conduit with the two fluids exiting the conduits proximate each other as a gas core surrounded by a liquid annulus, whereby the gas sprays the annularly surrounding liquid across the bed. Both constant and pulse flow may be provided.

2. Background of the Disclosure

Many petroleum refinery and chemical processes require uniformly distributing a mixed phase stream of gas and liquid, flowing in a downward direction, across a bed of particulate solid contact material such as catalyst particles, raschig rings and the like. Uniform distribution of the downflowing gas and liquid across the bed is important to insure that all of the particles in the bed are continuously and uniformly wetted by the liquid, and also to ensure the maximum possible contact between both fluids and the particulate contact material. Maximum utilization of the contact material is achieved only if all of the particles in the bed are continuously and uniformly wetted by the liquid and both fluid phases are in contact with each other throughout the bed. This is important in a fixed bed reactor operated in a trickle flow regime in which the flowing gas forms a continuous phase that fills up the space between the catalyst particles, while the liquid trickles down through the bed of catalyst particles in the form of liquid rivulets and films. In addition to underutilization of the catalyst, poor flow distribution also produces temperature maldistribution throughout the catalyst bed which, in turn, results in poor product selectivity and premature catalyst deactivation.

In order to evenly distribute the incoming gas-liquid mixture across the catalyst bed, a flow distributor tray which extends across the reactor vessel is disposed above each catalyst bed. The tray contains a plurality of flow distribution means, such as conduits, nozzles or orifices, to divide the downcoming liquid into a plurality of small streams or sprays. While units employing fixed beds and distributor trays are typically operated at an overall steady flow rate, it is known that periodically altering the flow rate by means of pulses or surges of increased liquid flow helps to maintain even liquid distribution across the particulate bed, so that all parts of the bed are kept wet by the downflowing liquid. Thus, U.S. Pat. No. 4,526,757 discloses a process and apparatus for automatically providing periodic surge or pulsed flow of liquid from the liquid distribution trays disposed over the catalyst beds in a fixed bed reactor, by providing a plurality of automatically actuating and operating siphon means disposed and distributed across the area of the distributor tray means within the reactor. The gas and liquid flow through separate conduits and orifices spaced apart from each other. U.S. Pat. No. 5,043,561 discloses a method and apparatus for improving the distribution of the downwardly flowing liquid across the particulate bed by providing a plurality of chimneys extending through the liquid distribution trays, whereby a plurality of overlapping cone shaped sprays of liquid and gas are used to continuously distribute the liquid across the top of the catalyst bed. In this method the gas and liquid both flow through the same conduit which contains a mandrel within to form an annulus in which the gas and liquid mix and exit the conduit onto a spray generating device. This provides good liquid distribution across the bed, but it is designed for a constant flow rate and also results in a high pressure drop across the tray. It would be an improvement to the art if a way could be found to provide a spray distribution of the liquid across the bed using either or both pulse and spray flow, and without the disadvantage of the high pressure drop of the method disclosed in the '561 patent.

SUMMARY OF THE INVENTION

The present invention relates to a means and method for providing spray distribution of a liquid onto and across a bed below, in both continuous and pulse flow, without the debit of a high pressure drop. Such means comprises a gas conduit and a liquid conduit, each having an entrance and an exit for permitting a respective fluid to flow through, wherein the liquid conduit surrounds a portion of the gas conduit, so that a portion of the gas conduit is disposed inside the liquid conduit to provide an annular space for the liquid to flow through. The exits of the gas and liquid conduits are positioned proximate each other, whereby the exiting gas is surrounded by downflowing liquid. The slight pressure drop through the gas conduit causes the exiting gas to expand, thereby contacting the exiting liquid to form a liquid spray. The liquid is sprayed onto a catalyst or other bed of particulate material below. A plurality of the liquid distribution means are disposed on and distributed across a distributor tray means over the bed. In one embodiment the liquid conduit entrance comprises siphon means for withdrawing liquid from the top of the tray when it reaches a siphon level and which stops withdrawing the liquid when its level falls below the siphon level which breaks the siphon. This embodiment automatically provides pulse flow of the liquid which is sprayed below. In another embodiment the liquid conduit does not have a siphon means so that the liquid flow therethrough is continuous. In yet another embodiment the distributor tray is provided with a plurality of both the continuous and pulse flow means for continuously distributing the liquid spray below, while also automatically providing pulse liquid spray in addition to the continuous liquid spray. The invention also relates to a method for receiving gas and liquid from above a tray and distributing them as a spray below, the method comprising passing the liquid in annular form downwardly from above the tray through a plurality of orifices extending through said tray and separately passing the gas downwardly from above the tray through separate orifices, with the downwardly flowing gas and liquid exiting below the tray as a gas core surrounded by an annulus of said liquid, and with the exiting gas contacting the liquid annulus below the tray to form a spray of the liquid and gas below the tray.

Further embodiments of the method include automatically periodically siphoning the liquid from the tray to provide pulse flow of the liquid, continuous flow of a portion of the liquid and liquid spray generating means positioned below the exiting liquid and gas. A further embodiment of the pulse spray means includes interconnecting the siphon means with conduits to compensate for nonlevelness of the distributor tray. In all of the embodiments of the invention the gas flow through the gas conduit is continuous irrespective of whether or not the liquid flow is pulsed or continuous. In yet another embodiment, combined continuous and pulse spray liquid is provided by the same means, by employing said siphon means and by further providing a plurality of liquid orifices or slots circumferentially spaced around the liquid conduit below the liquid entrance to the siphon means. In this embodiment, the plurality of liquid orifices or slots provided circumferentially spaced around the liquid conduit are not large enough to permit all of the liquid to flow through. This means that the liquid level on the tray rises until the siphon means is actuated and provides a surge or pulse flow of liquid which brings its level back down to a point proximate or below the liquid entrance of the siphon means, thereby breaking the siphon and stopping the pulse flow of liquid onto the bed below. The process is repeated continuously during the operation of the reactor. A further improvement in the liquid spray means of the invention is made by providing spray generating means, such as a baffle or splash plate or the helix disclosed in the '561 patent, underneath the gas and liquid exit.

BRIEF DESCRIPTION OF THE DRAWINGS

FIG. 1(a) schematically illustrates a vertical cross-section of a fluid distribution means of the invention having siphon means for providing periodic or pulse flow, while FIG. 1(b) schematically illustrates a vertical cross-section of a fluid distribution means of the invention which provides continuous flow, and FIG. 1(c) illustrates a further embodiment of the fluid distribution means of 1(b) including a helical spray generating means.

FIG. 2 is a partial vertical cross-section of a typical tray in a fixed bed reactor containing pulse flow distribution means of the invention.

FIG. 3 is a partial vertical cross-section of a typical distributor tray in a fixed bed reactor containing both pulse and continuous flow distribution means of the invention.

DETAILED DESCRIPTION

Referring to FIG. 1(a), a siphon flow distribution means 10 of the invention is shown mounted on distributor tray 52. Flow distribution means 10 includes a gas or vapor conduit 12, the lower portion of which is surrounded by a liquid distributor 14 to provide an annular liquid flow passage 16 between the gas and liquid conduits. Both conduits are hollow, cylindrical tubes or pipes open at both ends and, in the embodiment shown, are coaxial with respect to each other. It is preferred that the conduits, or at least the liquid conduit, extend slightly below the bottom of the tray as shown. This prevents the exiting liquid from running along the bottom of the tray if the tray isn't level and thereby insures that the exiting gas is surrounded by a liquid annulus to assist in spraying the liquid onto the bed below. It also insures that the exiting liquid falls onto the splash plate below, which further assists in creating a liquid spray. Siphon cap 18 is disposed over and around liquid conduit 14, extending downwardly over 14 to the desired actuation level, but not so far as to reach the top of distributor tray 52. Siphon cap or means 18 is attached to gas conduit 12 by means (e.g., such as welding) which forms a hermetic seal in order to permit a siphon to be formed during operation of the flow distribution means in a reactor or other unit. Baffle plate 20 is disposed above the top or entrance of the gas conduit to prevent liquid from entering it. A liquid spray deflector baffle or splash plate 22 is disposed below the fluid exits of the gas and liquid conduits to assist in distributing the downflowing liquid spray created by the flow distributor or distribution means across the particulate bed below (not shown). Baffle plate 22 can be flat, convex upwards, or convex downwards. In a further embodiment of the invention, conduit 24 coming off the top of cap 18 connects siphon cap 18 with a siphon cap of another siphon flow distribution means (not shown) to account for nonlevelness in the distributor tray. Reactors and other refinery and chemical units sometimes settle on their foundations unevenly which can create a slight tilt to the unit and this can cause one side of the distributor trays to be slightly higher than the opposite side. Further, an accumulation of fabrication and construction tolerances can also result in one or more fluid distribution trays in being nonlevel, with one side slightly higher than the other. Even where these conditions don't exist, it is not unusual for one side of a distributor tray to be slightly higher than the opposite side, thereby resulting in nonlevelness of the tray. What this ordinarily means with respect to operation of the tray and liquid flow distribution across the bed below with siphon flow distribution, is that the siphon distributors located at the low side of the tray operate more than they should, even to the extent of providing continuous flow instead of the pulse or intermittent flow they are intended for, while those on the high side operate infrequently, if at all. The net result can be that the particulate matter under the high side is not fully wetted, thereby resulting in wasted catalyst and space, hot spots, etc., and that under the low side is over loaded with liquid saturating and filling up the spaces between the particles in the bed, so that the liquid and gas don't mix and less reaction products are produced under the low side also. Interconnecting the siphon caps with a conduit or pipe enables synchronizing the siphoning of the multiple flow distributors, so that all of the siphon flow distributors deactivate at the same time. With respect to the working of interconnecting siphon caps with conduits, such as 24 illustrated in FIG. 1(a), those skilled in the art will appreciate that when any of the siphons disengages because the liquid level has dropped to or below level A, the gas present will flow into that particular siphon cap. The interconnecting conduits permit this gas to be transferred to the other interconnected siphon caps, thereby disengaging all of the interconnected siphons.

In operation, the liquid reactant arriving from above accumulates on the flow distributor tray and builds up to level B. This level B activates the liquid siphon causing a surge or pulse of liquid flow through the annular space 16 between the gas 12 and liquid 14 conduits and down onto the bed below the tray. The quick siphoning of the liquid causes the liquid level on the tray to retreat to a lower level, A, which breaks the siphon and the siphoning stops. The cycle repeats itself as the liquid builds up to level B again. Gas or vapor continuously flows from above the tray, through the vapor conduit 12, and down onto the bed below the tray. This provides a vapor core flow inside an annular liquid flow at the exit of the flow distributor 10 proximate the bottom of tray 52. The deflector plate 22, in conjunction with the expanding core vapors, creates a liquid spray proximate the exit of the flow distributor 10. The spray from each distribution means is in the form of a wide cone, with adjacent spray cones overlapping to provide full and efficient wetting of the particulate matter in the bed below.

Turning now to FIG. 1(b) which is a constant flow embodiment of the flow distribution means 30 of the invention, gas conduit 32 is surrounded by liquid conduit 26 to provide an annular space 28 for the liquid flow between the conduits. Liquid conduit 26 is shorter than liquid conduit 14 in the siphon means of FIG. 1(a). Baffle 20 disposed over the top or entrance of the gas conduit prevents liquid from entering it. The means is designed to operate with a constant liquid level A, on the tray, so as to provide the desired head, H, above the top of the liquid conduit 26. In this illustration, liquid spray deflector plate 34 is convex to improve the spray pattern. Other shapes may also be employed at the convenience of the practitioner. FIG. 1(c) illustrates a further embodiment of the fluid distribution means of 1(b) in partial view, including a helical spray generating means 50 of the type disclosed in the '561 patent. Turning to FIG. 1(c), a constant flow distribution means of the invention 40 comprises liquid conduit 44 surrounding the lower portion of gas conduit 42 with vertical apertures 46 and 48 as slots arranged around the circumference of the liquid conduit. The slots 46 and 48 may be of different lengths or of the same length as shown in the Figure. Still further, they may extend all the way to the top of the liquid conduit 44 at the discretion of the practitioner. Slots 46 and 48 serve as additional liquid inlets for liquid to flow into the annular space between the conduits. The slots are sized to be small enough so that, under normal operating conditions, most of the liquid on the tray flows over the top of liquid conduit 44 and down through the annular space between the gas and liquid conduits onto the bed below. The slots are present to insure continuous liquid flow onto the bed below during those occasional times when there is insufficient liquid head above the top of the liquid conduit to provide continuous flow. They also aid in reducing the nonuniform effects that may be encountered when the tray is not level, in maintaining at least some flow through the liquid distributor if the liquid level falls below the top of the liquid orifice.

In yet another embodiment of the invention which is not illustrated, but which will be readily understood and appreciated by those skilled in the art, in the surge or pulse flow distributor, such as that illustrated in FIG. 1(a), orifices or slots may be present in the wall of the liquid flow conduit 14. These slots are arranged around the circumference of the liquid conduit to provide only a portion of the liquid on the tray to flow continuously and steadily into and down through the annular space in the liquid conduit and sprayed onto the bed below. The remainder of the liquid builds up the liquid level on the tray until the siphon is automatically actuated, thereby providing the pulsed flow. In such an embodiment, a flow distributor of the invention provides constant flow combined with automatic pulse flow. In this combined, constant plus pulse flow embodiment, a plurality of smaller orifices or slots is used around the circumference of the liquid conduit to insure that the liquid flows down through the conduit and exits as an annular liquid flow to provide the feature of the invention which comprises a gas or vapor core flow surrounded by an annular liquid flow, to create the liquid spray distributed across the bed below.

In FIG. 2, a plurality of pulse flow distribution means 60 are mounted on a distributor tray 54 inside a cylindrical reactor defined by walls 56. The tray 54 is disposed over a particulate catalyst bed 58 containing catalyst particles 62. Flow distribution means are similar to means 10 illustrated in FIG. 1(a), except that the conduits for interconnecting the siphon caps are not shown for the sake of convenience. In operation, the liquid level on the tray builds up to a height B which actuates the siphon, thereby rapidly depleting the liquid level on the tray down to level A, at which point the siphon is broken and the flow of liquid onto the catalyst particles below ceases. Liquid flow onto the particles below the tray again occurs when the level rises to level B as shown. Gas or vapor flow downward through the gas conduits 12 is continuous, irrespective of whether or not liquid is flowing through the annular spaces 16 between the gas 12 and liquid conduits 14. The slight pressure drop through or across the gas conduit results in expansion of the gas or vapor as it exits the gas conduits 12, thereby pushing the downcoming and annular liquid surrounding it outward into a spray, assisted by spray generating means 22. This cycle is repeated indefinitely, with each pulse causing a large volume of liquid to be sprayed on and across the particulate bed, thereby keeping all of the catalyst particles wet. In another embodiment which is illustrated in FIG. 3, a plurality of both pulse flow means 60 and continuous flow means 30 of the invention are mounted on tray 64 disposed over a catalyst bed 58 containing catalyst particles 62. The liquid conduits which interconnect the siphon means on the pulse flow distributors, which are optional at the discretion of the practitioner, are not shown for the sake of convenience. The tray and bed are in a cylindrical reactor defined by walls 56. In operation, the continuous flow liquid spray distribution means of the invention 30 are always operating and spraying liquid onto the catalyst bed below. The plurality of pulse flow spray distribution means of the invention 60 operate intermittently as described above. Thus, a continuous flow of liquid is sprayed onto and across the catalyst bed below. At the same time, pulse flow through the pulse flow spray distribution means 60 periodically sprays additional liquid onto and cross the bed below to insure that all of the catalyst particles are kept wet. By way of an illustrative, but non-limiting example, the trays are designed so that the pulse flow means spray about 80 volume % of the total liquid onto the bed below each time the liquid level on the bed falls to point B, and ceasing when the level falls back to A.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A flow distribution means comprising a horizontally disposed tray containing a plurality of gas and liquid spray distribution means extending therethrough for receiving said gas and liquid from above said tray and spraying them below, wherein said gas and liquid spray distribution means comprises a gas conduit and a liquid conduit, each having an entrance and an exit for permitting a respective fluid to flow through, wherein said liquid conduit surrounds a portion of said gas conduit, so that a portion of said gas conduit is disposed inside said liquid conduit to provide an annular space for said liquid to flow through, with said exits positioned proximate each other, whereby the exiting gas is surrounded by downflowing liquid, with said exiting gas contacting said exiting liquid to form a liquid spray.

2. A means according to claim 1 wherein a liquid spray generating means is located below said gas and liquid exit of said spray distribution means.

3. A means according to claim 1 wherein said liquid spray distribution means includes automatically actuating siphon means for providing pulse flow of said liquid.

4. A means according to claim 3 wherein said liquid spray distribution means further includes a plurality of orifices circumferentially arranged on the liquid conduit below the siphon liquid level, whereby said distribution means provides both continuous and pulse liquid flow.

5. A means according to claim 3 wherein said liquid spray distribution means further includes conduits interconnecting said siphon means.

6. A means according to claim 3 wherein said tray contains a plurality of both continuous flow and pulse flow liquid spray distribution means.

7. A method for receiving gas and liquid from above a tray and distributing them as a spray below, said method comprising passing said liquid in annular form downwardly fran above said tray through a plurality of orifices extending through said tray and separately passing said gas downwardly from above said tray through separate orifices, with said downwardly flowing gas and liquid exiting below said tray as a gas core surrounded by an annulus of said liquid, and with said exiting gas contacting said liquid annulus below said tray to form a spray of said liquid and gas below said tray.

8. A method according to claim 7 wherein said liquid is automatically periodically siphoned from above said tray to provide pulse flow of said liquid.

9. A method according to claim 8 wherein said gas continuously passes through said gas orifices, wherein a portion of said liquid continuously passes through said liquid orifices and wherein a portion of said liquid periodically passes through said liquid orifices as pulse flow automatically actuated by siphon.

10. A method according to claim 7 wherein liquid spray generating means is positioned below said exiting liquid and gas.

11. A reactor which contains at least one fixed bed of particulate contact material and associated flow distribution means located above said bed, said flow distribution means comprising a horizontally disposed tray containing a plurality of gas and liquid spray distribution means extending therethrough for receiving said gas and liquid from above said tray and spraying them below, wherein said gas and liquid spray distribution means comprises a gas conduit and a liquid conduit, each having an entrance and an exit for permitting a respective fluid to flow through, wherein said liquid conduit surrounds a portion of said gas conduit, so that a portion of said gas conduit is disposed inside said liquid conduit to provide an annular space for said liquid to flow through, with said exits positioned proximate each other, whereby the exiting gas is surrounded by downflowing liquid, with said exiting gas contacting said exiting liquid to form a liquid spray.

12. A means according to claim 11 wherein a liquid spray generating means is located below said gas and liquid exit of said spray generating means.

13. A means according to claim 11 wherein said liquid spray distribution means includes automatically actuating siphon means for providing pulse flow of said liquid.

14. A means according to claim 13 wherein said liquid spray distribution means further includes a plurality of orifices circumferentially arranged on said liquid conduit below said siphon liquid level, whereby said distribution means provides both continuous and pulse liquid flow.

15. A means according to claim 13 wherein said liquid spray distribution means further includes conduits interconnecting said siphon means.

16. A means according to claim 13 wherein said tray contains a plurality of both continuous flow and pulse flow liquid spray distribution means.

17. A means according to claim 16 wherein said particulate contact material comprises a catalyst.

18. A means according to claim 11 wherein said particulate contact material comprises a catalyst.

* * * * *